United States Patent [19]
Wheeler

[11] 3,868,300
[45] Feb. 25, 1975

[54] METHOD OF MAKING A COMPOSITE PANEL LAMINATE HAVING DEEP INDENTATIONS

[75] Inventor: Robert G. Wheeler, Corvallis, Oreg.

[73] Assignee: Wood Processes, Oregon Ltd., Corvallis, Oreg.

[22] Filed: Nov. 15, 1972

[21] Appl. No.: 306,692

[52] U.S. Cl. ................. 162/124, 52/555, 156/210, 156/212, 156/219, 156/245, 156/285, 161/36, 161/37, 161/55, 161/270, 162/225
[51] Int. Cl. ........................................... D21f 13/00
[58] Field of Search .......... 156/220, 210, 212, 219, 156/285, 245, 625; 161/36, 37, 55, 270; 162/132, 116, 124, 218, 224, 225, 219; 52/555

[56] References Cited
UNITED STATES PATENTS

| | | | |
|---|---|---|---|
| 2,992,152 | 7/1961 | Chapman | 162/124 |
| 3,080,271 | 3/1963 | Quehl | 162/224 |
| 3,401,079 | 9/1968 | Wells | 162/219 |
| 3,423,267 | 1/1969 | Munk | 156/214 |
| 3,447,996 | 6/1969 | Himmelheber | 161/55 |
| 3,661,688 | 5/1972 | Wheeler | 161/37 |
| 3,748,222 | 7/1973 | Wheeler | 162/165 |
| 3,793,125 | 2/1974 | Kunz | 156/220 |

*Primary Examiner*—Leon D. Rosdol
*Assistant Examiner*—Bruce H. Hess
*Attorney, Agent, or Firm*—E. A. Buckhorn

[57] ABSTRACT

A composite panel laminate is produced having dense tough outer fibrous skins and a core of relatively coarse fibrous material. The skin on the indented side is unbroken and of substantially uniform thickness throughout such indented side. The panel is made by first preforming from a pulp slurry a web having substantially the same contour and configuration as the desired indented panel side, transferring said preformed web while still moist onto a matrix mold platen having a surface pattern complementary with the one side of the panel laminate, depositing a layer of desired loose core material over said web, covering said layer with a second moist web and then curing the assembly under heat and pressure to finish form said panel.

3 Claims, 6 Drawing Figures

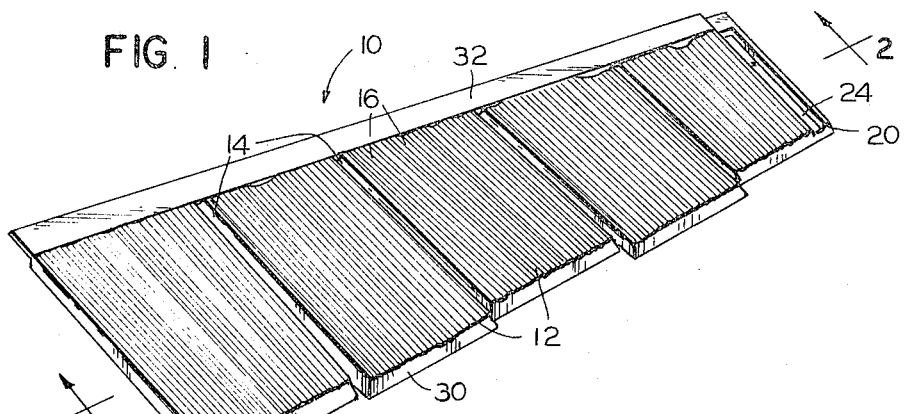
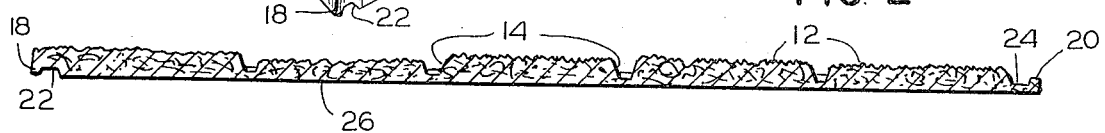
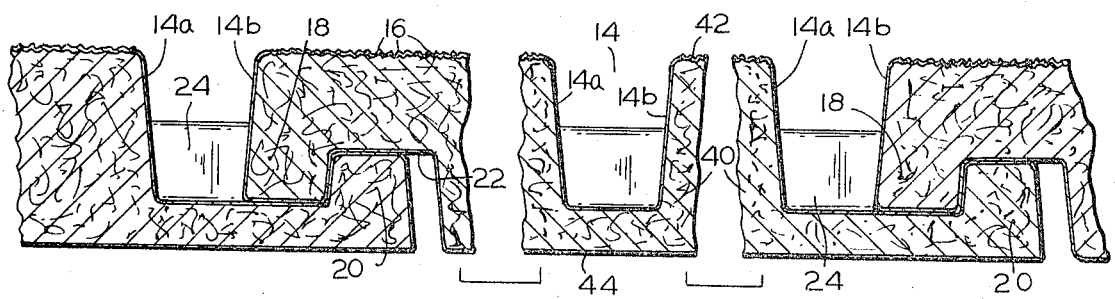
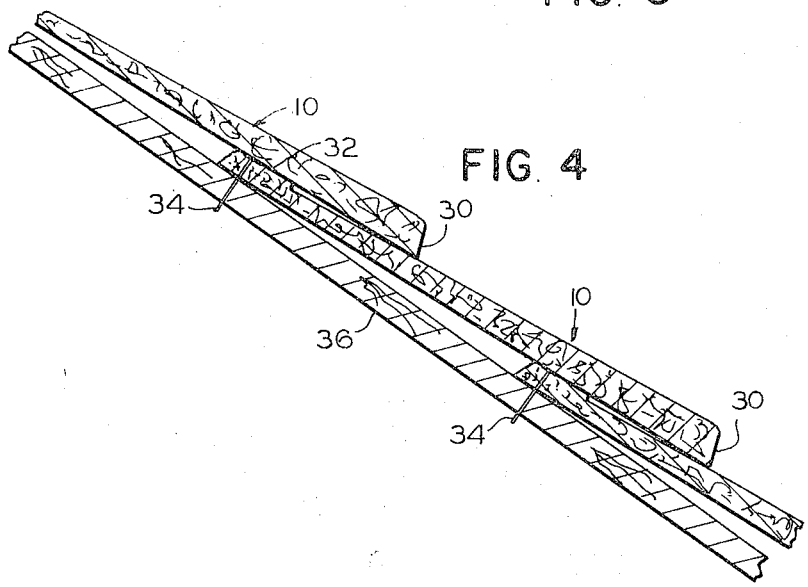

METHOD OF MAKING A COMPOSITE PANEL LAMINATE HAVING DEEP INDENTATIONS

BACKGROUND OF THE INVENTION

The present invention relates to a composite panel laminate provided with tough, dense surface skins of cellulosic fibers, a core of relatively coarse fibrous material, and one surface, such as the upper surface, being provided with an embossed pattern including relatively deep indentations. One form of a panel laminate having an embossed upper surface is disclosed in the U.S. Pat. No. 3,661,688, issued to Robert G. Wheeler, entitled "COMPOSITE BOARD LAMINATE." The laminate, as disclosed in such patent, is made by building up a sandwich consisting of a first moist web of cellulosic fibrous material, then covering the first web with a relatively thick layer of coarse fibrous material, followed by a second web similar to the first mentioned one. A pattern is then formed on either one or both surfaces of the sandwich by compressing the same between a pair of press plates provided with protuberant portions extending above the otherwise flat surface portions of the platen or plate. The embossing of one or both surfaces of the finished panel can properly be carried out by such process only in the event that the depth of the recessed portions of the panel is relatively small.

In the event that it is desired to produce a panel having relatively deeply indented surface portions, the forementioned process cannot be successfully employed for the reason that the web, even though moist, cannot stretch the required amount to completely cover the side walls of the depressed panel portion and, instead, the web will tear at such side walls or else, if the web does stretch without tearing, the web will be so thin over the side walls of the indentations so as to provide inadequate protection for the core layer of such areas.

SUMMARY OF THE INVENTION

In accordance with the present invention I successfully produce a composite panel laminate having relatively deep indentations on a surface thereof in which the skin covering the deeply indented surface and the remaining surface areas is of substantially uniform thickness throughout.

In accordance with the process aspect of the present invention, a first web is preformed having substantially the same contour and configuration of the desired finished panel. This first preformed web is then transferred, while still moist, onto a metal hot press mold plate having a surface contour and configuration completely complementary to the deeply indented surface pattern desired for one surface of the finished panel. A blanket of relatively coarse fibrous material is then piled on top of the preformed web and then a second web is laid down on top of the pile of core forming material. The sandwich thus formed, including the plate with the matrix embossing surface, is then fed into a hot press. The sandwich is then cured under heat and pressure to form the panel.

It is therefore, one object of the present invention to provide a composite panel laminate consisting of a core of relatively coarse fibrous material overlaid with dense, tough skins on each of the opposite sides, one of which skins having been preformed, prior to lay-up of the sandwich, with substantially the same contour and configuration as that of the desired panel, the skin on the embossed side of the panel being of substantially uniform thickness throughout the panel surface, including the side walls of the indented portions. In other words, the skin of the embossed surface is substantially unstretched, during the compression operation along the side walls of the indented surface portions, is unbroken and completely covers the core layer throughout the embossed areas with substantially the same thickness in such areas as the thickness of the web over the remaining or unembossed surface portions of the panel.

A further object of the invention is to provide a process for making an embossed composite panel laminate by first preparing one web of cellulosic fibrous material by suction through a screen having substantially the same configuration as the desired finished panel, the screen having been immersed in a slurry holding tank whereby a web of fibers if built up on the screen of substantially uniform thickness throughout. The preformed web is then placed over a matrix mold plate having a surface pattern which is entirely complementary to the surface pattern of the desired finished panel. Care is taken to the end that the preformed web is fitted on to the matrix mold in registry therewith. The sandwich is then completed by piling a layer of relatively coarse fibrous core forming material on to the preformed web. A second web is then spread on top of the core forming layer, the sandwich being then transferred to a hot press where the panel is formed under heat and pressure.

The slurry is preferably prepared as described in my U.S. Pat. No. 3,748,222 entitled "PROCESS FOR MAKING A FIBER OVERLAY WEB FOR A COMPOSITE BOARD." While any suitable core forming material may be employed, as disclosed or referred to in the prior art U.S. Pat. No. 3,661,688, mentioned above, I have also found it feasible to use bark, such as fir bark, which is readily available in northwest United States at minimum cost. The preparation of such bark for use in connection with one form of the present invention will be described more fully hereinafter.

A more detailed object of the invention, in accordance with one modification thereof, is to produce a composite panel laminate in the form of a plurality of interconnected shake shingles from which a roof may be covered at low cost and which is both weatherproof and durable.

A still further detailed object is to provide a new core filling material for composite panel laminates which is both inexpensive and, particularly, suitable for use in forming roof shingles where structural strength is not a requirement.

DRAWINGS

FIG. 1 is a view in perspective of a composite panel laminate in accordance with one form of the invention;

FIG. 2 is a cross sectional view taken generally along the line 2 — 2 of FIG. 1;

FIG. 3 is a cross sectional view to an enlarged scale, certain portions having been broken away representing a plurality of panel laminates assembled together in an overlapping edge to edge relation;

FIG. 4 is a cross sectional view through a plurality of panel laminates secured in position in a superposed relation;

DETAILED DESCRIPTION

Figure 5:
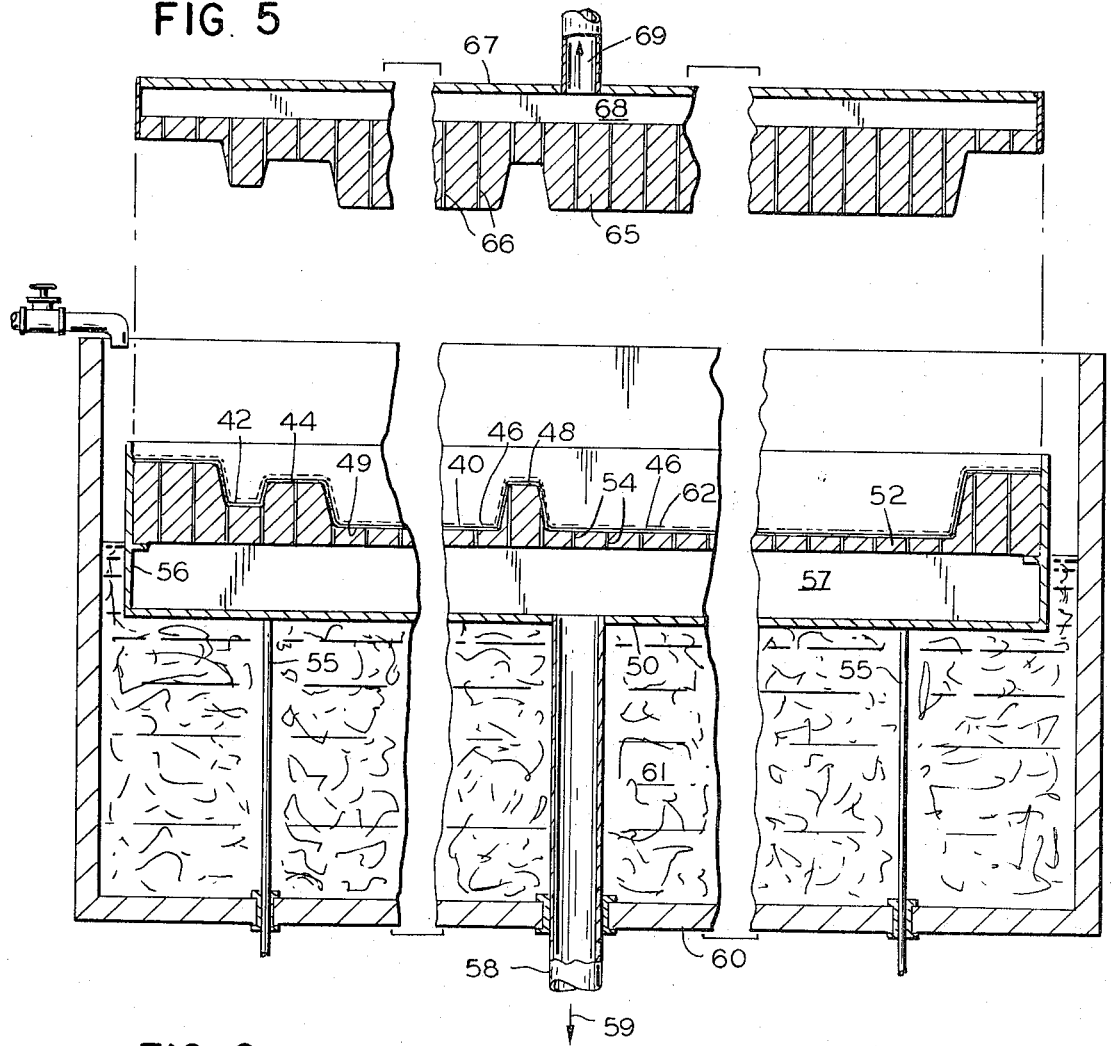
FIG. 5 is a view in cross section with parts broken away, illustrating apparatus for preforming a web for use in the manufacture of a panel illustrated in FIG. 1.

Referring to FIGS. 1 to 3, the invention will be described in connection with one embodiment thereof, the embodiment in this instance being a composite panel laminate 10 in the form of a roofing unit, such as a plurality of inter-connected shingle shakes 12 arranged in an edge to edge relation, the individual shakes being separated by deep grooves 14, which grooves extend more than 50% through the thickness of the panel, or of the order of one-half inch or more, as more clearly seen in FIGS. 2 and 3. Shake type shingles are frequently preferred for roofs because of their rustic appearance and, as illustrated in FIG. 1, the shingle end portions are of slightly staggered or uneven lengths. Moreover, the uppermost surface of the shingles is striated lengthwise by relatively shallow grooves of varying depths and widths for further ornamental enhancement, as shown at 16.

Referring to FIG. 3, the opposite ends of the panel are provided with oppositely extending flange portions 18 and 20 spaced from the remainder of the panel by grooves 22 and 24. The grooves 22 are only large enough to receive the upstanding flange portion 20 of the adjacent panel whereas the groove 24 is considerably wider so as, not only to be sufficient to receive the depending flange 18 of another adjacent panel, but also sufficient to leave a groove between the flange portions 18 and the adjacent groove side wall portion 14a of the other panel. The space remaining between the side wall portions 14a and 14b of the overlapping joints is, therefore, similar in width to the grooves 14 between the adjacent shingle areas of the midsection of the panel so that when the roof is covered the joints between adjacent shingle panels will be less obvious. Except for the groove 22 at the left edge, as viewed in the drawings, the underneath surface 26 of the panel is flat.

As viewed in FIGS. 1 and 4, the panel is of tapered thickness from the butt edge 30 of the shingle and the edge of the panel opposite the butt edge 30 is provided with a marginal edge portion 32 which is flat throughout the full length of the panel except at the right hand end, as viewed in FIG. 1. The thickness of the edge portion 32 is at least as great as at the crests of the striated upper surface immediately adjacent such edge portion 32. The marginal edge portion 32 defines a nailing strip whereby the panel unit may be secured, such as by nails 34, on to the roof sheathing 36. Inasmuch as the upper surface of the nailing strip 32 is flat, it will be smoothly engaged by the lower surface of the butt end of an overlapping superposed panel unit, as shown in FIG. 4.

As illustrated more clearly in FIG. 3, each panel unit consists of a central core 40 with dense, tough, fibrous skins 42 and 44 covering the upper and lower surfaces respectively of each panel unit. It will be observed that the skin on the upper surface 42, as well as over the side wall surface portions 14a and 14b of the grooves 14, is unbroken and is of substantially uniform thickness throughout all such portions. The core portion 40 of the panel units is thus fully protected against weather conditions by the skins 42–44 and, particularly, by the skin 42 covering the upper surface.

It will be obvious that, due to the relatively great depth of the grooves 14, particularly toward the butt ends of the shingles, it would not be possible to satisfactorily form these with a correspondingly shaped and contoured press plate upon a composite blanket of uniform thickness throughout. Accordingly, in accordance with the present invention the web utilized for forming the upper surface 42 is first preformed to generally the same shape as the skin of the finished panel. For an understanding as to how the webs are preformed as indicated reference should be had to FIGS. 5 and 6.

Figure 6:
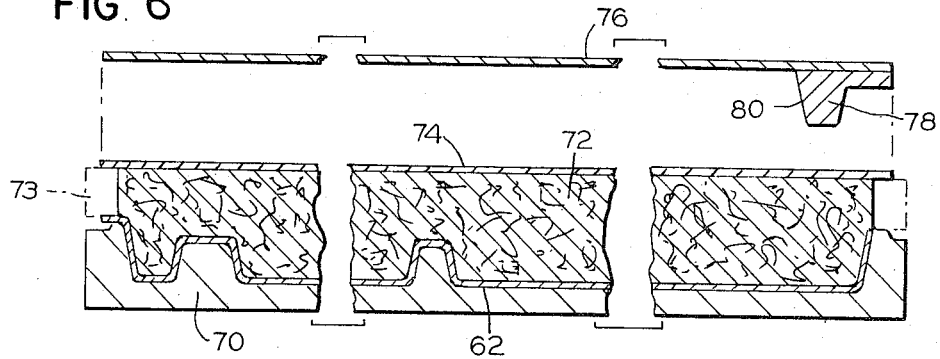
FIG. 6 is a cross sectional view, portions being broken away, illustrating one step in the process of building up a sandwich of components used in the manufacture of a panel as illustrated in FIG. 1.

It is to be understood that in the manufacture of the panel laminate 10 the upper surface thereof, as viewed in FIG. 1, will face downwardly so that in FIGS. 5 and 6 the panel configuration is inverted with respect to FIGS. 1, 2 and 3. As previously indicated, the web for forming the skin 42 of the upper surface of the panel is preformed. The suction box which is employed for this purpose includes a fine mesh wire screen or other foraminous material 40, illustrated in FIG. 5, which has been formed with substantially the same size and configuration as the size and configuration of the upper surface of the panel, that is, at least as regards the major details.

As viewed from the left hand side of FIG. 5, the screen includes a depending portion 42 corresponding to the flange 20 of the panel followed by a rib 44 corresponding to the panel groove 24. The screen also defines a series of flat portions 46 corresponding to the shingle portions 12 separated by ridges 48 corresponding to panel grooves 14. It is to be understood that minor details of the panel surface, such as the striations 16, are very shallow and can readily be formed during the final compression operation without appreciable stretching of the web during their formation, so that such details need not be incorporated in the surface of the screen 40. A suction box is illustrated in FIG. 5 at 50 incorporating the screen 40. A suitable backing is provided for the screen 40 in order to prevent the collapse of the screen during the suction operation. The backing includes a coarse mesh screen 49 of the same configuration as fine mesh screen 40 and underlying screen 40. The backing also includes member 52 having a multiplicity of holes 54 therethrough permitting free passage of air through the backing member 52. The contour of the upper surface of the backing member 52, as viewed in FIG. 5, is complementary to the configuration of the screens 40 and 49 in order that the configuration of the screen 40 will not be altered during operation under suction. A supporting box 56 is provided for the screens 40 and 49 and the backing member 52. The box 56 forms a chamber 57 between itself and the lower surface of the backing member 52, the box being further connected by one or more conduits 58, with suitable valving, to a suitable vacuum pump represented by the arrow 59. Suitable means, indicated by rods 55, are provided for lowering and raising the suction box into and out of the slurry in tank 60.

As the suction box is lowered into tank 60 filled with a pulp slurry 61, as hereinafter described, and suction applied through conduit 58, a pulp web indicated by dotted lines 62 will be built up on the upper surface of the screen 40. After the thickness of the web 62 has been built up to a desired extent the suction box is raised from the slurry tank and the web is transferred to a matrix mold plate 70, as illustrated in FIG. 6.

For transferring the web 62 from the suction box a pick up member 65 with holes 66 therethrough is lowered onto the upper surface of web 62 by suitable means not shown. Member 65 is mounted in the bottom of box 67 which also defines a chamber 68 above the member 65. Chamber 68 is connected to a suitable air pump through conduit 69. With the member 65 lowered onto the web 62, a suction is applied through conduit 69 and at the same time the air suction is released through conduit 58 to the suction box and, if desired, air flow slightly reversed through conduit 58, whereupon the web 62 will be picked up by member 65 and thereafter transferred to the mold plate 70. The upper surface of the mold plate conforms exactly with and is complementary to the desired configuration for the upper surface of the panel 10. As the web 62 is transferred onto the mold plate 70, care is taken so that all portions of the web 62 register completely with the contour features of the mold plate. With the web 62 in position on the mold plate 70, a blanket 72 of relatively coarse fibrous material is laid down of a desired depth, for example of from 3 to 5 inches, depending upon the thickness and density desired for the finished panel. A removable frame 73 is placed on top of web 62 to facilitate laying the blanket of loose fibrous material 72. After frame 73 is removed, a second web 74 similar to the web 62 in thickness is laid down upon the top of the blanket 72, and then a further plate 76 is lowered on to the top of the sandwich 62, 72, 74.

For forming such impressions as may be desired for the lower surface of the panel, such as for forming the groove 22 as previously described in connection with FIG. 1, a correspondingly shaped strip 78 may be attached to the underneath surface of the plate 76 as illustrated. Because of the steep sides 80 of the strip 78, tearing of the web 74 may occur at such sides during the compression of the sandwich, but since this surface is on the underneath side of the panel unit, it will not be exposed to weather. The plate 76 may be either a separate caul plate or it may be the lower surface of a hot press platen onto which the contoured strip 78 may be attached along one edge.

The matrix mold 70 with the sandwich 62, 72, 74 and plate 76 thereupon may then be placed in a hot press and the whole simultaneously compressed and heated as will be further hereinafter described.

The slurry 61 utilized in forming the webs 62 and 74 and the process for preparation of the same is preferably that which is described in greater detail in my prior U.S. Pat. No. 3,748,222, entitled "PROCESS FOR MAKING A FIBER OVERLAY WEB FOR A COMPOSITE BOARD." This slurry consists essentially of cellulosic fiber pulp mixed with a quantity of a pale thermoplastic neutral hydrocarbon resin and to which is also added quantities of a paraffin wax emulsion size and phenol-formaldehyde resin and water. Specific examples of pale thermoplastic neutral hydrocarbon resins are described in my aforesaid U.S. Pat. No. 3,748,222 as well as the relative proportions of such resins, paraffin wax emulsion size and phenolformaldehyde resin used. Due to the uneven surface of the hot press plate 70, it is important that the slurry employed in making the web, and particularly the web 62, that the finally compressed panel be readily separable from the mold plate and without any build-up of resinous materials on such mold plate. This is an important feature of the slurry described in my above mentioned application. Moreover, inasmuch as the panel, in this instance, is intended as a roof unit and hence will be exposed to weather, phenol-formaldehyde resin should be included in the slurry so that the resultant skins of the panel will be dense, tough and fully weatherproof, that is, resistant to deterioration when exposed to weather.

The thickness of the webs 62 and 74 as utilized in laying the sandwich as illustrated in FIG. 7 is of the order of three sixty-fourths to one-eighth inch, having a moisture content of about 75% of the total weight of the webs. After the final compression operation in the hot press the skins 42 and 44 will have a thickness of from sixty-fourth to one-sixteenth inch.

As regards the fibrous material for the core blanket 72 forming the core 40 of the final panel, any coarse fibrous material may be used such as described in my prior U.S. Pat. No. 3,661,688, referred to above. That patent refers specifically to wood waste material such as planer shavings, veneer flakes or the like mixed with a suitable adhesive such as phenolic resin, the wood particles having a moisture content of about 8 to 15%.

For use in making composite panel laminates, particularly for use as roofing units as described in the instant application where mechanical strength is not a requirement, I have found it entirely feasible to employ bark such as fir bark. Alternatively, a mixture of bark and coarse wood particles may be employed. Bark is readily available in the fir lumber producing areas at extremely low cost. Such bark has very little commercial value and the disposal thereof presents a problem due to restrictions against burning of waste material. For the preparation of bark particles it is preferred to reduce the bark chunks in a suitable attrition mill or hammer mill. The moisture content of the bark is then reduced to 18 to 20% based on the bone dry state of the bark prior to milling and, if the moisture content is higher, it should first be dried to about the moisture percentage stated. Approximately 6 to 8% of phenolformaldehyde resin, dry weight basis, and ¾ to 1%, dry weight basis, of parafin solids emulsion or petrolatum is then added and these ingredients thoroughly mixed with the bark fibers. Following mixing, the mass is then dried to reduce the moisture content to 8 to 10%, dry weight basis. The product temperature during the drying operation must be held below 220° F. so as not to precure the resins while at the same time the temperature is high enough so as to thoroughly melt the wax or petrolatum solids.

As to further details concerning the hot press operation whereby the sandwich 62, 74, 72 is cured under heat and pressure, reference may be had to my above mentioned prior patent, these details being now well known in the prior art and need not be described further herein. After the panel is removed from the hot press and cooled, the edges of the panel may be trimmed, as usual, before usage.

In the following claims the term "relatively coarse fibrous material" is meant wood waste material such as planer shavings, veneer flakes, wood chips, fir bark and the like. Also "pale thermoplastic neutral hydrocarbon resins" refers to such resins as are described in my prior U.S. Pat. No. 3,748,222, as well as the relative proportions of such resins and such other ingredients as paraffin wax emulsion size and phenol formaldehyde resin and by reference to such patent it is incorporated herewith for further detailed information as to such resins and relative proportions.

While the invention has been described with reference to a laminated shake shingle unit, it is to be understood that the invention is not to be so limited and that it is applicable to any composite panel laminate having indentations so deep that they cannot be embossed in the panel surface without rupturing the cover laminate or stretching it to such an extent as to materially weaken its effectiveness.

What I claim is:

1. The method of making a composite panel laminate having a pattern including relatively deep indentations on one side, the minimum thickness of said panel at said indentations being less than one-half the thickness of the unindented areas of said panel, the depth of said indentations being of the order of one-half inch or more, the method comprising,
   a. preparing a suction box having a matrix side of foraminous material with an outer surface defining a pattern of conforming at least with the major raised and indented areas of the pattern of said one side of said panel,
   b. immersing said suction box in a tank of cellulosic fibrous pulp slurry and building up by suction through said matrix surface a first web of cellulosic pulp fibers having generally the same contour and configuration as said one side of said panel,
   c. transferring said first web while still moist to a metal mold platen having a matrix surface complementary in conformation to said one side of said panel and with the contour of said preformed web fitting over the contour of the mold platen matrix surface,
   d. building up a core layer of loose relatively coarse fibrous wood waste material over said first web positioned on said mold platen to a depth several times greater than the maximum thickness of said panel,
   e. placing a second moist pulp web over the top of said core layer,
   f. curing the sandwich thus formed by heat and pressure in a hot press to form the finished panel laminate.

2. The method of making a composite panel laminate having on one side thereof a pattern including relatively deep indentations of the order of one-half inch or more as measured between points of minimum and maximum thickness, the method comprising,
   a. preparing a fine mesh wire screen having an indented surface pattern conforming substantially to the pattern of the desired indented surface of the finished panel,
   b. mounting said screen in a suction box with a suitable firm foraminous backing for said screen,
   c. preparing an aqueous slurry of cellulosic fibrous pulp,
   d. immersing said suction box in a tank of said pulp slurry and depositing by suction a layer of pulp on said screen conforming to the contour thereof, forming a preformed pulp web,
   e. transferring said preformed web while still moist onto a mold plate having a matrix surface conforming to the pattern and contour of the desired finished panel and so that the contour of the moist pulp web registers with the contour of the platen,
   f. preparing a quantity of fir bark by mixing with said quantity of bark having a moisture content of about 18 to 20 percent, then adding 6 to 8 percent of phenol formaldehyde resin, ¾ to 1 percent parafin solids, and then mixing the same to reduce the bark to a fibrous mass and thoroughly mixing the same with the aforesaid ingredients, drying said mass at a temperature of about 220° F to a moisture content of about 8 to 10 percent,
   g. placing a core layer of several inches of the mixed bark mass over the pulp web,
   h. placing a second moist pulp web over said core layer,
   i. curing the sandwich in a hot press by heat and pressure to form the finished panel.

3. The method of making a composite panel laminate having a pattern including relatively deep indentations as compared with the maximum overall thickness of the panel and being of the order of one-half inch or more between points of minimum and maximum thickness, on at least one side, said method including the steps:
   a. preforming from a cellulosic pulp slurry by suction against a foraminous matrix surface a first moist web of pulp fibers of substantially uniform thickness throughout and of generally the same contour and configuration as said one side of said panel,
   b. transferring said first web while still moist to a metal mold platen having a matrix surface complementary in contour and configuration to said one side of said panel and fitting said first web in registery with and over said mold platen surface,
   c. building up a core layer of prepared loose relatively coarse fibrous wood waste material over said first web,
   d. placing a second moist fibrous pulp web over said core layer,
   e. curing the sandwich thus formed by heat and pressure in a hot press to finish form the panel.

* * * * *